United States Patent
Sun et al.

(10) Patent No.: US 9,289,817 B2
(45) Date of Patent: Mar. 22, 2016

(54) DEVICE FOR RIVETING BRUSH HOLDER AND BRUSH HOLDER PLATE

(71) Applicant: Zhejiang Linix Motor Co., Ltd., Dongyang, Zhejiang (CN)

(72) Inventors: Zhubing Sun, Zhejiang (CN); Shan Du, Zhejiang (CN)

(73) Assignee: ZHEJIANG LINIX MOTOR CO., LTD., Dongyang, Zhejiang (CN)

( * ) Notice: Subject to any disclaimer, the term of this patent is extended or adjusted under 35 U.S.C. 154(b) by 101 days.

(21) Appl. No.: 14/324,572

(22) Filed: Jul. 7, 2014

(65) Prior Publication Data

US 2015/0336160 A1    Nov. 26, 2015

(30) Foreign Application Priority Data

May 20, 2014    (CN) .......................... 2014 1 0212553

(51) Int. Cl.
*B21J 15/00* (2006.01)
*B21J 15/14* (2006.01)
*B21J 15/10* (2006.01)
*B21J 15/16* (2006.01)

(52) U.S. Cl.
CPC *B21J 15/14* (2013.01); *B21J 15/10* (2013.01); *B21J 15/16* (2013.01); *Y10T 29/53774* (2015.01)

(58) Field of Classification Search
CPC ............ B21J 15/00; B21J 15/10; B21J 15/14; B21J 15/16; B21J 15/18; B21J 15/20
See application file for complete search history.

(56) References Cited

U.S. PATENT DOCUMENTS

| | | | | | |
|---|---|---|---|---|---|
| 445,936 | A | * | 2/1891 | Pegram | B21J 15/14 227/154 |
| 1,351,444 | A | * | 8/1920 | Simpson | B21J 15/18 72/407 |
| 1,469,864 | A | * | 10/1923 | Way | B21J 15/10 29/243.53 |
| 1,955,302 | A | * | 4/1934 | Leister | B21J 15/14 29/243.53 |
| 2,845,826 | A | * | 8/1958 | Harcourt | B21J 15/32 72/404 |
| 3,543,985 | A | * | 12/1970 | Adolphi | B21J 15/10 227/114 |
| 3,602,135 | A | * | 8/1971 | Monnin | B30B 15/14 100/344 |
| 6,478,722 | B1 | * | 11/2002 | Graham | B21J 15/10 29/243.53 |

* cited by examiner

*Primary Examiner* — Lee D Wilson
*Assistant Examiner* — Tyrone V Hall, Jr.
(74) *Attorney, Agent, or Firm* — Global IP Services; Tianhua Gu

(57) ABSTRACT

A device for riveting brush holder and a brush holder plate, comprising a worktable. A positioning mechanism for positioning the brush holder and the brush holder plate is provided on the worktable. A left riveting cylinder and a right riveting cylinder are provided on two opposite sides of the worktable corresponding to the positioning mechanism, respectively, a left riveting die being provided at an end of the piston rod of the left riveting cylinder, a right riveting die being provided at an end of the piston rod of the right riveting cylinder. A first intelligent inching switch and a second intelligent inching switch are connected in series in the control circuit, the first intelligent inching switch being provided beside the left riveting cylinder, the second intelligent inching switch being provided beside the right riveting cylinder. Only when the first intelligent inching switch and the second intelligent inching switch are pressed down simultaneously, the left riveting cylinder and the right riveting cylinder can be started to drive the left riveting die and the right riveting die to rivet the brush holder and the brush holder plate which are positioned on the positioning mechanism.

18 Claims, 1 Drawing Sheet

//DEVICE FOR RIVETING BRUSH HOLDER AND BRUSH HOLDER PLATE

CROSS REFERENCE TO RELATED PATENT APPLICATION

The present application claims the priority of the Chinese patent application CN 201410212553.3 filed on May 20, 2014.

TECHNICAL FIELD

The present invention relates to a riveting device, in particular to a device for riveting a brush holder and a brush holder plate.

BACKGROUND OF THE INVENTION

The brush holder and brush holder plate assembly is one of components of a brush DC motor. The brush holder for a carbon brush and the brush holder plate need to be riveted together during the assembly process. In the prior art, the riveting of the brush holder and the brush holder plate is usually implemented by workers via manual needle-nose pliers. On one hand, such a riveting method is low in operating efficiency. On the other hand, such a riveting method has poor quality of riveting and is likely to result in a problem that the position of the brush holder on the brush holder plate cannot meet the ideal position requirements, resulting in a problem that the position of the carbon brush after assembled on the brush holder cannot be in good contact with a commutator, further resulting in a problem of rapid wear or even falling-off of the carbon brush.

SUMMARY OF THE INVENTION

In order to overcome the deficiency in the prior art, the present invention provides a device for riveting a brush holder and a brush holder plate, which is capable of improving the riveting quality of the brush holder and the brush holder plate, improving the operating efficiency, and additionally improving the safety of the riveting operation, and is capable of avoiding accidents caused by the improper operation of workers during riveting.

In order to achieve the object mentioned above, the present invention employs the following technical solution. The present invention provides a device for riveting a brush holder and a brush holder plate, comprising a worktable, a positioning mechanism for positioning the brush holder and the brush holder plate is provided on the worktable; a left riveting cylinder and a right riveting cylinder are provided on two opposite sides of the worktable corresponding to the positioning mechanism, respectively, a left riveting die being provided at an end of the piston rod of the left riveting cylinder, a right riveting die being provided at an end of the piston rod of the right riveting cylinder, the left riveting die and the right riveting die being oppositely provided on both sides of the positioning mechanism, the left riveting cylinder and the right riveting cylinder being controlled by a same control circuit; a first intelligent inching switch and a second intelligent inching switch are connected in series in the control circuit, the first intelligent inching switch being provided beside the left riveting cylinder, the second intelligent inching switch being provided beside the right riveting cylinder; and only when the first intelligent inching switch and the second intelligent inching switch are pressed down simultaneously, the left riveting cylinder and the right riveting cylinder can be started to drive the left riveting die and the right riveting die to rivet the brush holder and the brush holder plate which are positioned on the positioning mechanism. During riveting, the brush holder and the brush holder plate are preassembled firstly, and then are positioned on the positioning mechanism. The operators need to press down the first intelligent electric switch and the second intelligent electric switch by the left hand and the right hand, respectively, now the left riveting cylinder and the right riveting cylinder can be started so as to drive the left riveting die and the right riveting die to rivet the brush holder and the brush holder plate which are positioned on the positioning mechanism. Therefore, accidents, caused when one hand of the operator has not yet left the area between the left riveting die and the right riveting die while the other hand of the operator touches the switch, can be effectively avoided, and the safety of the riveting operation can be greatly improved.

Preferably, the positioning mechanism comprises a positioning base and a locking mandrel, a threaded hole being provided in the center of the positioning base, an upward protrusion being provided on two opposite sides of the positioning base corresponding to the threaded hole, a positioning groove used for fitting the brush holder being formed on the upward protrusion, a thread segment that fits threads on the positioning base being formed at the lower end of the locking mandrel, a positioning segment that fits the center hole of the brush holder plate being formed in the middle segment of the locking mandrel. When in positioning, the preassembled brush holder and brush holder plate are fitted in the positioning groove, and a riveting pin of the brush holder penetrates through the brush holder plate upward, with the center hole of the brush holder plate being basically coaxial with the threaded holes of the positioning base; and then, a positioning core plate penetrates through the center hole of the brush holder plate to fit the threaded holes of the positioning base, and an outer wall of the positioning segment of the locking mandrel fits the center hole of the brush holder plate so as to adjust the position of the brush holder plate to guarantee the accuracy of the riveting position.

Preferably, the vertical cross-section of the positioning groove is of a wedge structure with a narrow upper opening and a wide bottom, so that the positioning groove can fit the brush holder to limit the height direction of the brush holder in order to guarantee the accuracy of the riveting position.

Preferably, the control circuit is connected with a solenoid valve and an adjustable time relay for controlling the operating time of the left riveting cylinder and the right riveting cylinder, so that the riveting quality and the consistency of the riveting quality can be guaranteed on one hand, and the riveting quality problems caused by controlling the riveting time manually can be avoided.

Preferably, the rear end of the piston rod of the left riveting cylinder and the rear end of the piston rod of the right riveting cylinder extend to outside the respective cylinder body and form an extension segment, respectively, a limiter being separately provided on the respective extension segment, so that the riveting stroke of the left riveting die and the right riveting die can be limited to guarantee the riveting quality.

Preferably, an electrical controller is provided on the worktable, a control switch and a pneumatic pressure monitor being provided on the electrical controller, wherein the electrical controller is set such that all the data of the device during the operating is made clear.

Preferably, a pneumatic throttle is provided on the left riveting cylinder and the right riveting cylinder, respectively, wherein the pneumatic throttle is used for adjusting the gas pressure of the left riveting cylinder and the right riveting cylinder.

Preferably, an arc-shaped notch is formed in the middle part of a stamping end face of the left riveting die and in the middle part of a stamping end face of the right riveting die, respectively, the arc-shaped notches being capable of separately fitting the locking iron mandrel, both sides of each of the two arc-shaped notches separately forming stamping protrusions for riveting the brush holder and the brush holder plate.

Therefore, the present invention has the following beneficial effects that both the riveting quality of the brush holder and the brush holder plate and the operating efficiency can be improved; in addition, the safety of the riveting operation can be improved, thereby avoiding accidents caused by the improper operation of the workers during riveting, and promising high riveting quality.

IN THE DRAWINGS

1—Worktable; 2—Brush holder; 21—Brush holder plate; 3—Positioning base; 41—Left riveting cylinder; 411—Left riveting die; 412—First intelligent electric switch; 42—Right riveting cylinder; 421—Right riveting die; 422—Second intelligent electric switch; 5—Locking iron mandrel; 61—Limiter; 62—Pneumatic throttle; 7—Electrical controller; 71—Adjustable time relay; 72—Pneumatic pressure monitor; 73—Control switch; 8—Arc-shaped notch; 9—Stamping protrusion.

DETAILED DESCRIPTION OF THE INVENTION

The present invention will be further described in details as below with reference to the drawings by specific embodiments.

Embodiment

Figure 1:
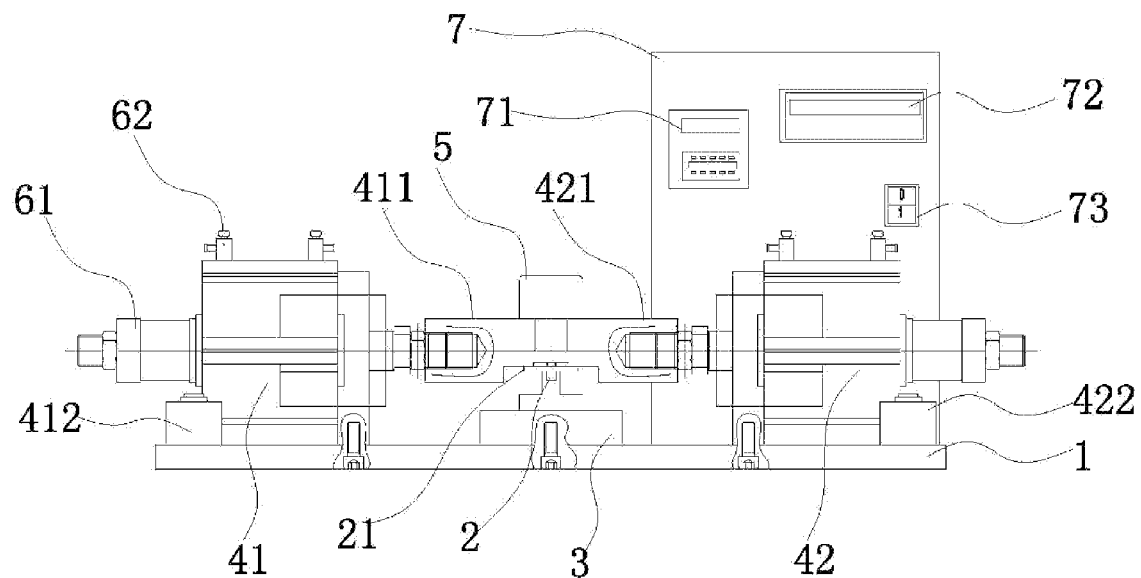
FIG. 1 is a structure diagram according to the present invention.

As shown in FIG. 1, a device for riveting a brush holder and a brush holder plate is provided, comprising a worktable 1. A positioning mechanism for positioning the brush holder 2 and the brush holder plate 21 is provided on the worktable 1. A left riveting cylinder 41 and a right riveting cylinder 42 are provided on two opposite sides of the worktable 1 corresponding to the positioning mechanism, respectively, a left riveting die 411 being provided at an end of the piston rod of the left riveting cylinder 41, a right riveting die 421 being provided at an end of the piston rod of the right riveting cylinder 42, the left riveting die 411 and the right riveting die 421 being oppositely provided on both sides of the positioning mechanism, the left riveting cylinder 41 and the right riveting cylinder 42 being controlled by a same control circuit. A first intelligent inching switch and a second intelligent inching switch are connected in series in the control circuit, the first intelligent inching switch being provided beside the left riveting cylinder 41, the second intelligent inching switch being provided beside the right riveting cylinder 42. Only when the first intelligent inching switch and the second intelligent inching switch are pressed down simultaneously, the left riveting cylinder 41 and the right riveting cylinder 42 can be started to drive the left riveting die 411 and the right riveting die 421 to rivet the brush holder 2 and the brush holder plate 21 which are positioned on the positioning mechanism. During riveting, the brush holder 2 and the brush holder plate 21 are preassembled firstly, and then are positioned on the positioning mechanism. The operators need to press down a first intelligent electric switch 412 and a second intelligent electric switch 422 by the left hand and the right hand, respectively, now the left riveting cylinder 41 and the right riveting cylinder 42 can be started so as to drive the left riveting die 411 and the right riveting die 421 to rivet the brush holder 2 and the brush holder plate 21 which are positioned on the positioning mechanism. Therefore, accidents, caused when one hand of the operator has not yet left the area between the left riveting die 411 and the right riveting die 421 while the other hand of the operator touches the switch, can be effectively avoided, and the safety of the riveting operation can be greatly improved.

The positioning mechanism comprises a positioning base 3 and a locking mandrel, a threaded hole being provided in the center of the positioning base 3, an upward protrusion being provided on two opposite sides of the positioning base 3 corresponding to the threaded hole, a positioning groove used for fitting the brush holder 2 being formed on the upward protrusion, a thread segment that fits threads on the positioning base 3 being formed at the lower end of the locking mandrel, a positioning segment that fits the center hole of the brush holder plate 21 being formed in the middle segment of the locking mandrel. When in positioning, the preassembled brush holder 2 and brush holder plate 21 are fitted in the positioning groove, and a riveting pin of the brush holder 2 penetrates through the brush holder plate 21 upward, with the center hole of the brush holder plate 21 being basically coaxial with the threaded holes of the positioning base 3; and then, a positioning core plate penetrates through the center hole of the brush holder plate 21 to fit the threaded holes of the positioning base 3, and an outer wall of the positioning segment of the locking mandrel fits the center hole of the brush holder plate 21 so as to adjust the position of the brush holder plate 21 to guarantee the accuracy of the riveting position.

The vertical cross-section of the positioning groove is of a wedge structure with a narrow upper opening and a wide bottom, so that the positioning groove can fit the brush holder 2 to limit the height direction of the brush holder 2 in order to guarantee the accuracy of the riveting position. The control circuit is connected with a solenoid valve and an adjustable time relay 71 for controlling the operating time of the left riveting cylinder 41 and the right riveting cylinder 42, so that the riveting quality and the consistency of the riveting quality can be guaranteed on one hand, and the riveting quality problems caused by controlling the riveting time manually can be avoided.

The rear end of the piston rod of the left riveting cylinder 41 and the rear end of the piston rod of the right riveting cylinder 42 extend to outside the respective cylinder body and form an extension segment, respectively, a limiter 61 being separately provided on the respective extension segment, so that the riveting stroke of the left riveting die 411 and the right riveting die 421 can be limited to guarantee the riveting quality. An electrical controller 7 is provided on the worktable 1, with a control switch 73 and a pneumatic pressure monitor 72 being provided on the electrical controller 7, wherein electrical controller 7 is set such that all the data of the device during the operating is made clear. A pneumatic throttle 62 is provided on the left riveting cylinder 41 and the right riveting cylinder 42, respectively, wherein the pneumatic throttle 62 is used for adjusting the gas pressure of the left riveting cylinder 41 and the right riveting cylinder 42.

Figure 2:
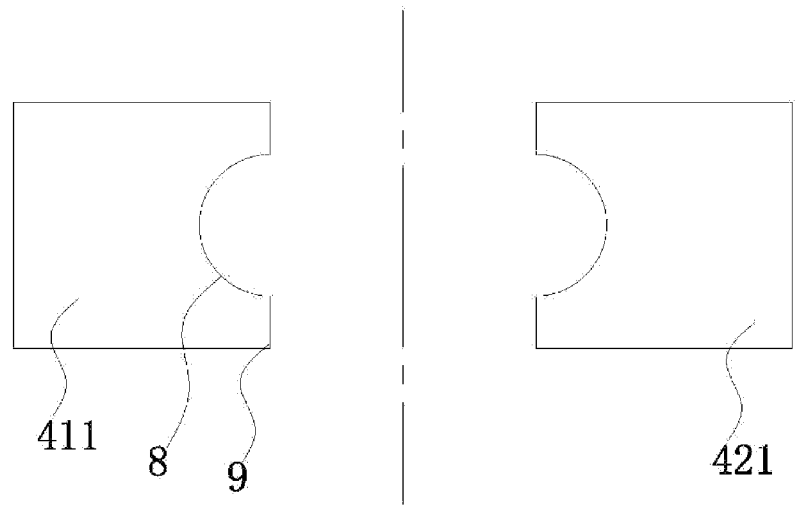
FIG. 2 is a structure diagram of a left riveting die and a right riveting die according to the present invention.

As shown in FIG. 2, an arc-shaped notch 8 is formed in the middle part of a stamping end face of the left riveting die 411 and in the middle part of a stamping end face of the right riveting die 421, respectively, the arc-shaped notches 8 being capable of separately fitting the locking iron mandrel 5, both sides of each of the two arc-shaped notches separately forming stamping protrusions 9 for riveting the brush holder 2 and the brush holder plate 21.

As shown in FIGS. 1 and 2, when in operating, the electrical controller 7 is arranged on the mounting plate, and the control switch 73 and the pneumatic pressure monitor 72 are arranged on the electrical controller 7, wherein the electrical controller 7 is set such that all the data of the device during the operating is made clear. The electrical controller 7 is provided with an adjustable time relay 71, wherein the setting of the adjustable time relay 71 may make the operation convenient and guarantee the riveting effect. By the time relay, the operation may be set to automatically stop after 2s of the riveting time, effectively preventing the problem that the riveting effect is influenced as the operators operate or turn on/off the power supply arbitrarily, and ensuring that the consistency of products meets the relevant requirements. The left riveting cylinder 41 and the right riveting cylinder 42 are provided with the pneumatic throttles 62, respectively, wherein the pneumatic throttles 62 are used for adjusting the gas pressure of the left riveting cylinder 41 and the right riveting cylinder 42.

When in stamping and riveting, the preassembled brush holder 2 and brush holder plate 21 are positioned on the positioning base 3 to make four riveting pins of the brush holder 2 protrude upward; the brush holder 2, the brush holder plate 21 and the base 3 are locked and fixed by the locking iron mandrel 5; the first intelligent electric switch 412 and the second intelligent electric switch 422 are simultaneously started, so that the left riveting cylinder 41 and the right riveting cylinder 42 drive the left riveting die 411 and the right riveting die 421 to rivet the brush holder 2 and the brush holder plate 21, respectively. By the adjustable time relay 71, the operation is set to automatically stop after 2s of the riveting time.

What is claimed is:

1. A device for riveting a brush holder and a brush holder plate, comprising a worktable, characterized in that a positioning mechanism for positioning the brush holder and the brush holder plate is provided on the worktable; a left riveting cylinder and a right riveting cylinder are provided on two opposite sides of the worktable corresponding to the positioning mechanism, respectively, a left riveting die being provided at an end of the piston rod of the left riveting cylinder, a right riveting die being provided at an end of the piston rod of the right riveting cylinder, the left riveting die and the right riveting die being oppositely provided on both sides of the positioning mechanism, the left riveting cylinder and the right riveting cylinder being controlled by a same control circuit; a first intelligent inching switch and a second intelligent inching switch are connected in series in the control circuit, the first intelligent inching switch being provided beside the left riveting cylinder, the second intelligent inching switch being provided beside the right riveting cylinder; and only when the first intelligent inching switch and the second intelligent inching switch are pressed down simultaneously, the left riveting cylinder and the right riveting cylinder can be started to drive the left riveting die and the right riveting die to rivet the brush holder and the brush holder plate which are positioned on the positioning mechanism.

2. The device for riveting a brush holder and a brush holder plate according to claim 1, characterized in that the control circuit is connected with a solenoid valve and an adjustable time relay for controlling the operating time of the left riveting cylinder and the right riveting cylinder.

3. The device for riveting a brush holder and a brush holder plate according to claim 1, characterized in that the rear end of the piston rod of the left riveting cylinder and the rear end of the piston rod of the right riveting cylinder extend to outside the respective cylinder body and form an extension segment, respectively, a limiter being separately provided on the respective extension segment.

4. The device for riveting a brush holder and a brush holder plate according to claim 1, characterized in that an electrical controller is provided on the worktable, a control switch and a pneumatic pressure monitor being provided on the electrical controller.

5. The device for riveting a brush holder and a brush holder plate according to claim 1, characterized in that a pneumatic throttle is provided on the left riveting cylinder and the right riveting cylinder, respectively.

6. The device for riveting a brush holder and a brush holder plate according to claim 1, characterized in that an arc-shaped notch is formed in the middle part of a stamping end face of the left riveting die and in the middle part of a stamping end face of the right riveting die, respectively, the arc-shaped notches being capable of separately fitting the locking iron mandrel, both sides of each of the two arc-shaped notches separately forming stamping protrusions for riveting the brush holder and the brush holder plate.

7. The device for riveting a brush holder and a brush holder plate according to claim 1, characterized in that the positioning mechanism comprises a positioning base and a locking mandrel, a threaded hole being provided in the center of the positioning base, an upward protrusion being provided on two opposite sides of the positioning base corresponding to the threaded hole, a positioning groove used for fitting the brush holder being formed on the upward protrusion, a thread segment that fits threads on the positioning base being formed at the lower end of the locking mandrel, a positioning segment that fits the center hole of the brush holder plate being formed in the middle segment of the locking mandrel.

8. The device for riveting a brush holder and a brush holder plate according to claim 7, characterized in that the control circuit is connected with a solenoid valve and an adjustable time relay for controlling the operating time of the left riveting cylinder and the right riveting cylinder.

9. The device for riveting a brush holder and a brush holder plate according to claim 7, characterized in that the rear end of the piston rod of the left riveting cylinder and the rear end of the piston rod of the right riveting cylinder extend to outside the respective cylinder body and form an extension segment, respectively, a limiter being separately provided on the respective extension segment.

10. The device for riveting a brush holder and a brush holder plate according to claim 7, characterized in that an electrical controller is provided on the worktable, a control switch and a pneumatic pressure monitor being provided on the electrical controller.

11. The device for riveting a brush holder and a brush holder plate according to claim 7, characterized in that a pneumatic throttle is provided on the left riveting cylinder and the right riveting cylinder, respectively.

12. The device for riveting a brush holder and a brush holder plate according to claim 7, characterized in that an arc-shaped notch is formed in the middle part of a stamping end face of the left riveting die and in the middle part of a stamping end face of the right riveting die, respectively, the arc-shaped notches being capable of separately fitting the locking iron mandrel, both sides of each of the two arc-shaped notches separately forming stamping protrusions for riveting the brush holder and the brush holder plate.

13. The device for riveting a brush holder and a brush holder plate according to claim 7, characterized in that the vertical cross-section of the positioning groove is of a wedge structure with a narrow upper opening and a wide bottom.

14. The device for riveting a brush holder and a brush holder plate according to claim 13, characterized in that the control circuit is connected with a solenoid valve and an adjustable time relay for controlling the operating time of the left riveting cylinder and the right riveting cylinder.

15. The device for riveting a brush holder and a brush holder plate according to claim 13, characterized in that the rear end of the piston rod of the left riveting cylinder and the rear end of the piston rod of the right riveting cylinder extend to outside the respective cylinder body and form an extension segment, respectively, a limiter being separately provided on the respective extension segment.

16. The device for riveting a brush holder and a brush holder plate according to claim 13, characterized in that an electrical controller is provided on the worktable, a control switch and a pneumatic pressure monitor being provided on the electrical controller.

17. The device for riveting a brush holder and a brush holder plate according to claim 13, characterized in that a pneumatic throttle is provided on the left riveting cylinder and the right riveting cylinder, respectively.

18. The device for riveting a brush holder and a brush holder plate according to claim 13, characterized in that an arc-shaped notch is formed in the middle part of a stamping end face of the left riveting die and in the middle part of a stamping end face of the right riveting die, respectively, the arc-shaped notches being capable of separately fitting the locking iron mandrel, both sides of each of the two arc-shaped notches separately forming stamping protrusions for riveting the brush holder and the brush holder plate.

\* \* \* \* \*